Feb. 5, 1935.  H. T. WHEELER  1,989,903
PACKING RING SHAPE
Filed Dec. 10, 1931   3 Sheets-Sheet 1

INVENTOR.
Harley T. Wheeler

Feb. 5, 1935. H. T. WHEELER 1,989,903
PACKING RING SHAPE
Filed Dec. 10, 1931 3 Sheets-Sheet 2
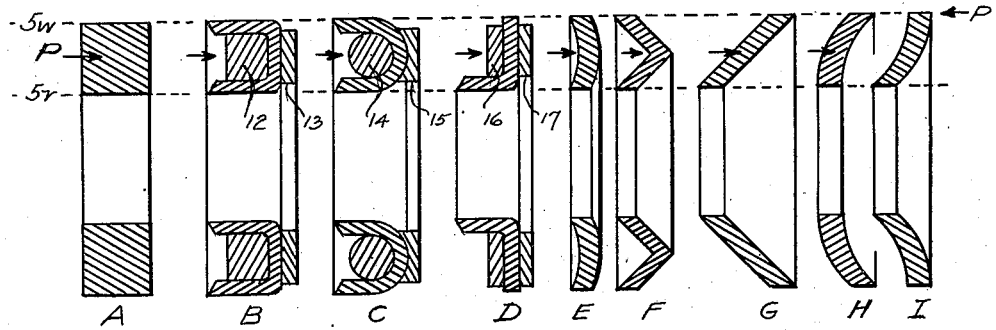
Fig 5
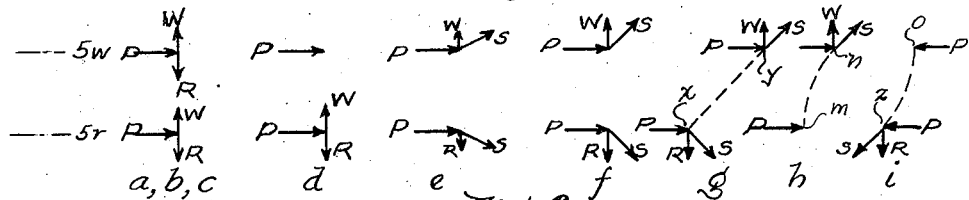
Fig 6
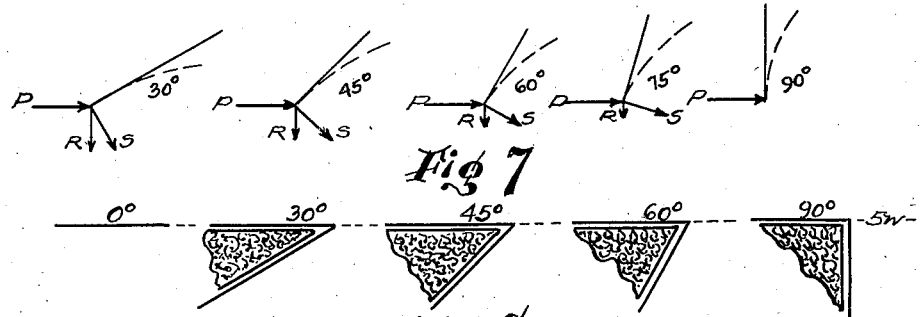
Fig 7
Fig 8
Fig 9
INVENTOR.
Harley T. Wheeler Feb. 5, 1935. H. T. WHEELER 1,989,903
PACKING RING SHAPE
Filed Dec. 10, 1931 3 Sheets-Sheet 3

INVENTOR.
Harley T Wheeler

Patented Feb. 5, 1935

1,989,903

UNITED STATES PATENT OFFICE 1,989,903

PACKING RING SHAPE

Harley T. Wheeler, Dallas, Tex.

Application December 10, 1931, Serial No. 580,015

5 Claims. (Cl. 288—1)

This invention relates to fibrous packing rings, and its chief advantage lies in evolving the shape of a packing ring which will create the minimum packing friction.

Another advantage is that packing rings may be designed to create a desired amount of friction against the moving surface, namely the control of normal applied pressure.

Yet another advantage is that the friction due to saturation of excessive width packings may be partially compensated.

One other advantage is that the excess friction due to deficient width packings may be partially compensated.

Still another and important advantage is that while the normal applied pressure may be regulated at the moving surface, the maximum reaction may be obtained at the stuffing-box wall.

With the foregoing advantages and objects in view, other advantages and improvements in application will be disclosed as the description proceeds accompanied by the drawings, wherein:

Figure 5 is the evolution of the packing ring shape.

Figure 6 is the resolution of impressed pressure to normal applied pressure, of the shapes in Figure 5.

Figure 7 is the reduction of normal applied pressure at the angle of contact with the moving surface.

Figure 8 is the representation of the annular ring wedge.

Figure 9 is the relation of the holding power of cones against moving and stationary surfaces.

Figure 1:
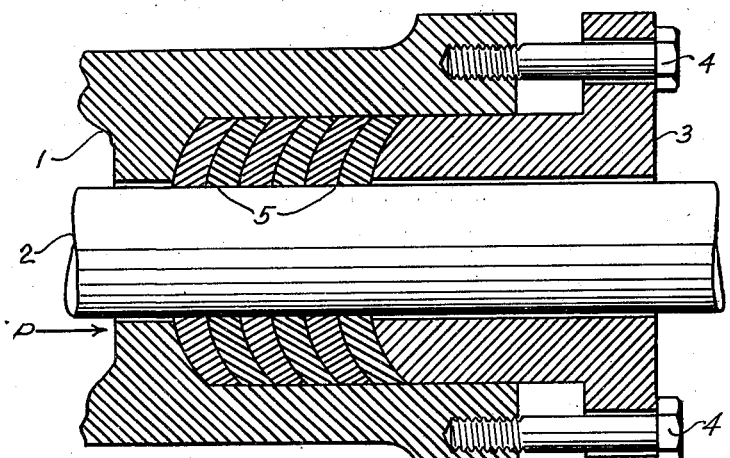
Figure 1 is the cross-section of a stuffing-box fitted to receive the packing rings made according to this invention.

Referring now to Figure 1, which shows the method of arranging a stuffing-box to receive the rings made according to this invention. The machine frame 1 contains the stuffing-box cavity thru which the rod 2 extends. The gland 3 is held in position and adjusted by the cap screws 4, 4. The packing rings 5 are confined around the rod 2 by the gland 3 and the pressure P is in the direction shown by the arrow.

Figure 2:
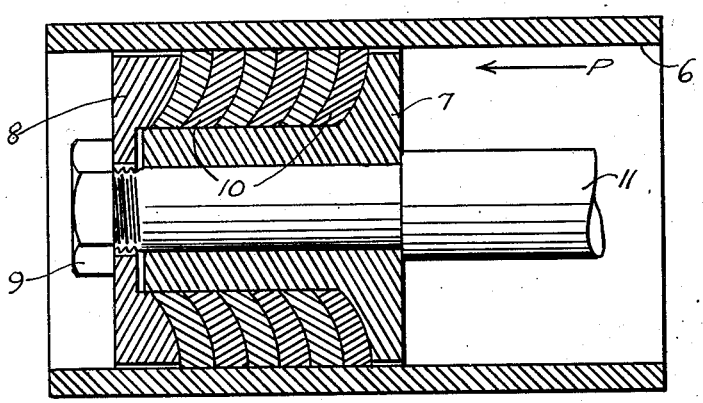
Figure 2 is a piston head in cross-section fitted to receive the piston rings made according to this invention.

The variation of this invention for piston rings is shown in Figure 2, piece 6 being a pump liner, 7 the piston head and 8 the follower head, the latter being held against the former by a nut 9 tightened on the threads on the end of the piston rod 11. The packing rings 10 are held in position by the follower head 8 and are acted upon by the pressure P in the direction shown by the arrow.

Figure 3:
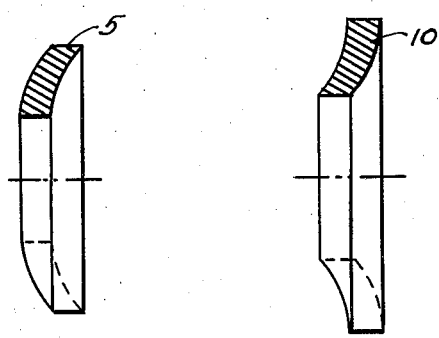
Figure 3 is a partial cross-section of a packing ring used in the stuffing-box of Figure 1.
Figure 4:
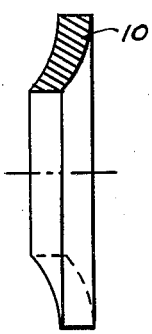
Figure 4 is a partial cross-section of a piston ring used on the piston of Figure 2.

Figure 3 is a partial cross-section of an elevation of the packing ring 5 used in Figure 1. Figure 4 is the piston ring 10 in partial cross-section, and as used in Figure 2.

As a preliminary to the development of what I call the fundamental shape to create minimum friction, the evolution of the stuffing-box packing ring as it has appeared in practice and in patents, is reviewed in Figure 5. The plane $5w$ represents the stuffing-box wall contact and plane $5r$ represents the moving surface contact, or the rod. The small arrows indicate the direction of impressed pressure application, P. The shape A is the commonly used braided type of annular ring impregnated with a heavy lubricant, being in liquid tension when subjected to pressure. The shape B is the familiar cup ring, the ring 12 being a spreader to induce contact of the cup lips and 13 the back for packing gland adjustment. The shape C is a modification of B, the ring 14 being a circular spreader and the back 15 being curved to force the cup around the spreader 14 and increase the contact of the cup lips. The shape D is the L-shaped cup, the backs 16 and 17 clamping the radial section, this being the first attempt to eliminate any stuffing-box wall reaction. The shape E is a cupped radial disc, an attempt to utilize pressure reaction without spreaders or gland compression to secure contact against the adjacent surfaces. The shape F is the "V-ring" an extreme modification of the shape E, using a considerable portion of the impressed pressure for reaction. The shape G is the latest development of "finger-tight" packings being automatic in its reactions against all surfaces. The shapes H and I will result from this investigation and will be explained in detail later in the disclosure.

Figure 6 is the resolution of pressures of the shapes shown in Figure 5. The plane 5w represents the stuffing-box wall contact and the plane 5r is the contact at the rod surface, both planes corresponding to those of Figure 5. The pressure resolutions a, b and c are taken from the shapes A, B and C, being alike as to pressure distribution. If P is the impressed pressure, R is the normal applied pressure against the rod and W the normal applied pressure against the box wall. Normal applied pressure is defined as pressure transferred from the ring perpendicularly to an adjacent surface.

For all annular ring sections in liquid or gaseous tension, and cups made of thin material contacting in a parallel manner with an adjacent surface, a law applies:

27. For any porous body in liquid or gaseous tension, or for any thin section in parallel contact with an adjacent surface, the normal applied pressure is equal to the thrust at that point.

The explanation is, that whatever the means employed to conduct the pressure thruout the interior of the packing rings section, it will be equal in all directions. Referring now to my application for Letters Patent, Serial Number 526,388, dated March 30, 1931, the first law of friction states that the thrust at any point is equal to the drop of pressure at that point. So that in the shapes A, B and C, the normal applied pressure is less than the impressed pressure by the amount of the drop of pressure, or is equal to the thrust.

Referring again to Figure 6, the resolution d is shown to have an elimination of the box wall reaction, in that P on the plane 5w is not resolved, due to the clamping of the rings 16 and 17, of Figure 5. The lip of the cup however, is a thin section in parallel contact with the rod and subscribes to the twenty-seventh law, before written.

Resolution e, of Figure 6, is the first ring type to bring in another relation, namely the action of pressure on a packing ring surface which contacts at an angle with an adjacent surface. This is an endeavor to reduce the thrust to a lower value without reducing the sealing capability of the ring. The resolution of impressed pressure now becomes a thrust force S perpendicular to the surface of the ring, which may be resolved by the parallelogram of forces to the desired normal applied pressure. The resolved force then must be related to the angle of contact, and the following law is written:

28. For any porous annular ring section whose surface faces the source of pressure and which contacts with any parallel adjacent surfaces at an obtuse angle, the normal applied pressure due to thrust is equal to the cosine of the angle times the thrust at that point.

The explanation is similar to that of the twenty-seventh law, with the additional feature that the force S is perpendicular to the ring surface and is not coincident with the resultant. That is, in all porous or open sections having the pressure distribution equal and in all directions, the normal applied pressure resultant is coincident with the direction of the thrust, whereas in angling surface section, they are not coincident.

While the shape E, of Figure 5, according to the disposition of force should have reduced nearly all of the thrust against the rod, the type was found to have a very high friction, which I have learned by means of the laws of friction to be due to "reflex action" of porous structures whose outlines lie in an arc.

It was found, experimentally no doubt, that the shape F of Figure 5, altho using a greater proportion of thrust, created less friction than the shape E. Shape F is usually made to contact with the adjacent surfaces at 135 degrees (facing the pressure source). This "V-ring" as resolved at f in Figure 6, gives a resultant R having about seven-tenths of the thrust, being the cosine of 135 degrees times the thrust, according to the twenty-eighth law. This is the first type of packing to utilize an appreciable angling contact and to be practically free from the necessity of frequent gland adjustment. However, in comparison to later developments, the friction is high, tho an improvement over the shapes A to E.

The shape G of Figure 5 is a truncated-cone which contacts with the moving surface at a given angle and with the box wall at a complementary angle. This shape is the single greatest improvement made up to the present time, the practical and geometrical reasons for which will be analyzed in detail as a basis for this invention. The use of a porous cone introduced an innovation in packing, for contrary to all preceding shapes, two different kinds of thrust reaction are employed and what may be called the "fixed point," or fulcrum is used. Coincident with the foregoing, is the displacement of the sealing and the "fixed point."

So far as outward appearances are concerned the inner points of a cone contact with the rod, or plane 5r, at an angle similar to the shapes E and F, but the contact at the wall is a direct opposite to the shapes E and F. Referring now to Figure 6, the resolution g on the plane 5r, the pressure P is resolved according to the twenty-eighth law of friction written herein, into forces S and R. At the wall, the pressure resolution apparently is S and the normally applied W. The latter resolution is however, not satisfactory, for any surface sloping away from the source of pressure will leak, and that it does not in the case of the cone is due to what is termed the "reaction of an annular ring wedge," hereinafter explained. The innovation of the cone establishes displacement of the "fixed point" at point y, a greater distance from the source of pressure than x, the point of sealing. The slope of a cone therefore is a lever, rotating around point y and pressing against the rod at x to seal the joint.

The practical consideration of cone reactions which point the way to this invention, are: Any cone made of porous fabric, with or without cement or vulcanization, must be made with a 45 degree slope to maintain holding power at the wall and the rod surface. Cones made of compressed graphite and mica, for another example, will hold best at about 60 degrees. Plastic cones of shredded metals graphited and greased, will hold at about 55 degrees. Any variation from these angles will cause leakage, always at the wall surface, but not at the rod.

In Figure 7 is shown the regularity of pressure resolution at the moving surface and according to the twenty-eighth law. Pressure P is resolved by the angling surface to a thrust S.

The normal applied pressure R for a 30 degree contact is about five-sixths of the pressure P impressed, being seven-tenths at 45 degrees, and so on, at 60 and 75 degrees is in proportion to the natural sine of the included angle. At 90 degrees, the cone becomes a radial disc and there can be no resolution of the thrust against the rod surface. The foregoing relations consider that saturation is normal, specifically, that the fluxion value over a required pressure range does not vary widely from a value of unity. It may also be noted that the included angle of contact may be that formed by the concave surface of a cone and the rod, or is the angle of contact between a curved surface and the rod.

Figure 8 is the representation in cross-section of the outer tip, or portion of a cone ring forming an annular ring wedge with the stuffing-box wall. At zero degrees, the ring slope and the wall surface are coincident, so that there is no included angle. Between zero and 90 degrees included angle, any number of values are possible, 30, 45, 60 and 90 degrees being used as apt illustrations which occur. The outline of each figure is the adjacent surface mentioned and the cross-sections are any porous ring, the plane $5w$ representing the stuffing-box surface.

For example, a wedge is made of commercial asbestos cloth. The density and porosity is first determined by the weaving, and is altered somewhat when made into packing rings in moulds. When formed into a 30 degree angle, pressure will leak by on the plane $5w$ regardless of how well the ring fits its confines, or how tight the adjustment is. The same leakage occurs at 60, 75 and 90 degrees, but at 45 degrees the ring automatically seats and will hold a very high pressure. The explanation is found in the phenomena of an annular ring wedge, which is expressed as a law:

29. For the maximum normal applied pressure due to thrust, the included angle of the radial cross-section of an annular ring wedge is obtained when the average seepage flow is at the highest rate.

The explanation is that for every porosity of material there is an included angle at which the pressure will flow thru and into the material. At angles greater or less, the pressure will pass around the joints between the ring wedge and the adjacent surfaces and little seepage will flow thru the material. For porous cloth, the angle is about 45 degrees, for finely ground materials it varies from 50 to 60 degrees. The normal applied pressure at the wall, shown at $g$, Figure 5, can exist only when there is a seepage flow to give an unbalanced pressure between increments of length, each unbalanced pressure vector being capable of resolution by the parallelogram of forces.

In Figure 9 is shown the relative holding power of the lips of a cone as compared to the outer diameter, or annular wedge ring reaction. The ordinates are in pressure and the abcissa in included angles of contact. For a zero and 90 degree value, the fabric cone will hold nothing at the outer wall, as indicated by the curve A, but the retentive capability rises to a maximum at 45 degrees. For a mixture of graphite and mica compressed, for another example, the maximum will occur at about 60 degrees, but will be less than the fabric in holding power. Other materials, such as thin metal foils and fibers, have other reactions.

The holding power of the lip, or the collapsibility of the convex surface of a cone facing a pressure, is shown by the curve C, Figure 9, having no resistance at zero included angle, and increasing proportionally to the decrease of included angle values. The pressure which can be held is limited only by the resistance of the material to shear. It should be apparent that a slightly convex surface, such as is shown by a 75 degree angle, will hold a very high pressure.

The subject of this invention is the shape of a ring having the maximum normal applied pressure reaction at the stationary surface, and a controlled friction due to thrust, at the moving surface, and by means of Figure 10, an explanation will be made. The plane $5r$ is the moving surface and plane $5w$ is the box wall. A ring is to be designed which will contact at the wall at an angle $v$, for example 45 degrees with a line of contact $bo$, and at the rod at angle $x$, for example 90 degrees with a line of contact $ao$. At point $a$, line $af$ is made perpendicular to the line $ao$, and at point $b$, line $bf$ is made perpendicular to line $bo$. The point $f$ is the intersection of the two perpendiculars and with this point as a center, an arc of radius $r$ is subscribed passing thru the points $a$ and $b$. It should be apparent that the arc $ab$ is a tangent at the wall at 45 degrees, and at the rod at 90 degrees. The line $qp$ bisects the arc and passes thru the intersection of the lines $ao$ and $bo$. The thickness $ac$ of the ring is desired and a distance $fh$ is spaced off on the rod surface on plane $5r$, the same radius $r$ being used to describe the arc $cd$. The ring contour thus formed, the edges $bd$ and $ac$ being equal, will fit any other rings so formed. The resolution of normal applied pressure due to thrust at point $a$, for example, is the unbalanced force times the sine of angle $x$, or zero. Thus the contour provides the maximum wedge reaction at the wall and has a zero normal applied pressure due to thrust at the moving surface. It may be observed that so far as the angles of contact are concerned, the broken line $aob$ may be substituted for the arc $ab$, and that line $cpd$ may be used instead of the arc $cd$, giving a ring contour $acpdbo$, the characteristics of which are not included in the present application. It should also be apparent that the cross-section of Figure 10 gives the maximum wall reaction due to thrust and a zero resolution at the moving surface and is therefore called the ultimate relation.

Figures 10, 11:
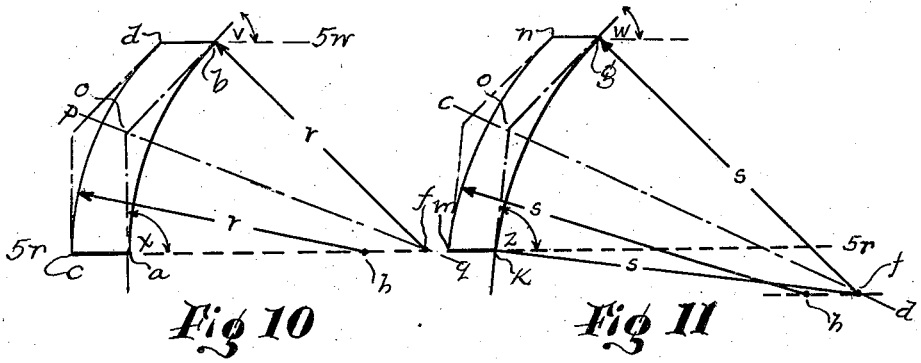
Figure 10 shows the geometrical relations of a packing ring with no normal applied pressure on the moving surface and maximum wedge reaction.
Figure 11 shows the geometrical relations of a maximum wedge reaction against the stationary surface, and controlled normal applied pressure against the moving.

In Figure 11 is shown a modification of the ultimate relation of Figure 10. The angle $w$ with a line of contact $go$ gives the maximum wall reaction due to thrust, while angle $z$ with a line of contact $ko$, is less than 90 degrees and greater than 45 degrees. The center point $f$ does not fall on the rod surface, or plane $5r$, so a different proceeding for forming the contour is necessary. At point $g$, line $gf$ is drawn perpendicular to line $go$. The line $ko$, forming one side of angle $z$, is moved back and forth on the plane $5r$ until the point of intersection $o$, makes two equal lines $ko$ and $go$. Then at the fixed point $k$, line $kf$ is drawn perpendicular to $ko$ and will intersect line $gf$ at point $f$, and it will be found that $gf$ and $kf$ are equal, being the radii $s$. With $f$ as a center, the arc $kg$ is described, being tangent at point $k$ and $g$, at angles $z$ and $w$ respectively. For example, a ring of thickness $mk$ is desired, a line is drawn thru point $f$ parallel to the plane $5r$, and the distance $fh$ spaced off; radius $s$ will then describe arc $mn$, the distances $ng$ and $mk$ being equal. It should be obvious that the ring will fit any other ring so formed. The maximum reaction is possible at the wall due to angle $w$, while the normal applied pressure due to thrust at point $k$, for example, will be the thrust times the sine of angle $z$. Thus it is possible to vary the angle $z$, and so control the normal applied pressure due to thrust, all other sources of normal applied pressure being disregarded. Similar to Figure 10, the broken line $og$ may replace the arc $kg$ and the line $qcn$ may replace the arc $qn$, making a ring contour $kqcngo$, the characteristics of which are not included in the present application.

Figure 12:
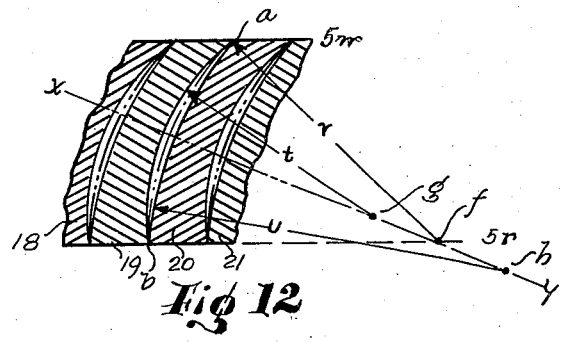
Figure 12 shows the geometrical relations of the packing ring made according to this invention with provision for compensating thermal expansion.

In Figure 12 is shown a further variation of the ring contours of Figures 10 and 11, and is used for compensating thermal expansion. The rings 18, 19, 20 and 21 contact with the planes $5w$ and $5r$, but are open between the adjacent concave and convex surfaces. The arc $ab$, indicated by the dotted center-line, is formed by the radius $r$ using point $f$ as a center. The line $xy$ bisects the arc $ao$. The convex surface of ring 20 is formed by spacing off distance $fh$ on the bisecting line $xy$ and using a radius $u$ which intersects points $a$ and $b$. To form the concave side of ring 19, distance $fg$ equal to $fh$, is spaced off on the same line $xy$ and a radius $t$ used to describe an arc also passing thru points $a$ and $b$. A ring is formed which has space for internal expansion before the increase of volume due to saturation occurs.

Figure 13:
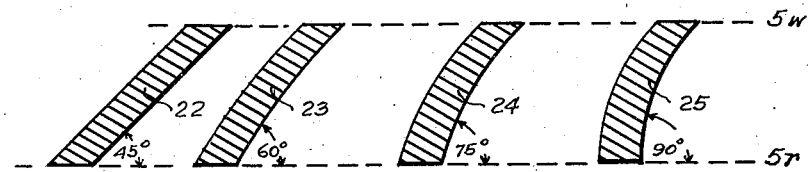
Figure 13 shows the comparative arcs of packing rings for normal width.
Figure 14:
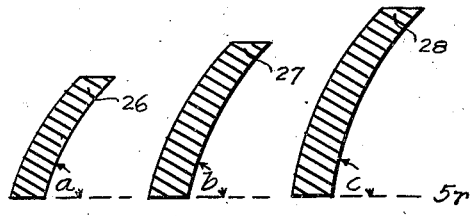
Figure 14 shows the method of compensating for excessive width.

Figure 13 shows the change from the 45 degree cone 22, to the ultimate relation 25. As the included angles of a 60 degree ring 23, a 75 degree ring 24 and a 90 degree ring 25 are drawn, the degree of curvature increases, as the resemblance to the cone decreases. The ultimate relation 25, as before analyzed can resolve no pressure due to thrust against the rod. Yet to be of use to seal, there must be a source of normal applied pressure, which may be derived from two other sources, the elongation of a section due to saturation and the "reflex action," but nothing except the shape is considered in this application. In Figure 14 is shown the application of this invention to decrease the apparent effect of saturation due to excess width, it being considered that other sources of normal applied pressure may be controlled by the construction of the ring. The rings are represented on the rod surface, or plane $5r$. The ring 26, of a contact included angle $a$, is of normal width, or that of minimum saturation. The rings 27 and 28 are for widths in excess of the normal, the friction rising in each in proportion to the volume added. Therefore by using this invention, the included angles $b$ and $c$ are increased in some proportion to the added width, thus lessening the normal applied pressure due to thrust, as a compensation to the friction due to saturation.

Figure 15:
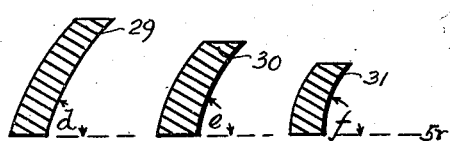
Figure 15 shows the method of compensating for deficient width.

In Figure 15, the ring 29 is for normal width and made at an included angle of contact $d$. The rings 30 and 31 are for widths deficient in width, which as before mentioned are high in friction. Compensation for saturation cannot be made by increasing the angles $e$ and $f$ nearer to 90 degrees, it being considered that other sources of normal applied pressure are controlled by the construction of the ring.

In conclusion, there are three main sources of friction between solid bodies and porous structures, namely, mechanical compression, the excess friction due to different phases of saturation and the normal applied pressure which results from the net thrust. While saturation is necessary it must be under control and it is a factor of volume, of shape and of porosity and density. Volume is a question of stuffing-box design while the other reactions may be controlled by the use of a number of my applications for Letters Patent, the question of shape being the subject of this specification.

The packing rings to be constructed according to this shape may be made by my process for crimping a strip of cloth, Serial Number 509,622, dated January 1, 1931, and the crimping of annular rings, Serial Number 515,232, dated February 12, 1931, and the formation of helically wound plaits, Serial Number 543,791, dated June 12th, 1931, and of other forms as desired. Any of the foregoing processes applied to the hereindescribed shape may also be regulated for porosity and assembled according to my method of controlling the distribution of friction, Serial Number 571,822, dated October 29, 1931.

In this application for Letters Patent, I have shown a series of designs which may be profitably employed to control the normal applied pressure due to thrust and how to obtain the maximum stuffing-box wall reaction of concave-convex and cone shape types of packing rings. The reactions of saturation are considered as separate inventions not here included. The appended claims consider the shape only and such usage as is therein defined is considered within the spirit of this invention.

I claim:

1. In a stuffing-box containing a movable surface and subjected to a fluid medium under pressure, a packing of annular ring shape having edges in contact with said stuffing-box wall and said movable surface, one face comprised of a radially curved convex surface inclining from the movable surface away from the source of said fluid pressure medium, the opposing face being a concave cupped surface.

2. In a stuffing-box containing a movable surface subjected to a fluid medium under pressure, a packing of annular ring shape having edges in contact with said stuffing-box wall and said movable surface, one face having a radially curved convex surface inclining from said movable surface away from the source of said fluid pressure medium, the opposing face being concave and of identical curvature with the convex surface, the thickness of said ring at said stationary and said movable surfaces being equal.

3. A porous annular packing structure for a stuffing-box containing a stationary and a movable surface, said packing adapted to be saturated by a fluid medium under pressure, the edges of said structure being in contact with said stationary and said movable surfaces and having a convex longitudinally curved face inclining from the movable surface away from the source of said medium, the opposing face being a concave cupped surface, said saturating medium causing said porous structure to expand and to simultaneously seal said movable surface and said stuffing-box wall.

4. Packing rings for sealing off the passage of pressure fluid between a stationary and a movable surface, said rings being of absorbent material and of uniform thickness and curved in longitudinal section, presenting the concave face away from the source of said pressure fluid.

5. Packing rings to fit within a stuffing box about a moving rod and adapted to seal off the passage of pressure fluid, said rings being of porous flexible material and curved from said rod away from the source of said pressure fluid, said rod being approximately radial relative to the arc of curvature of said rings.

HARLEY T. WHEELER.